US011146499B2

(12) United States Patent
Sung et al.

(10) Patent No.: US 11,146,499 B2
(45) Date of Patent: Oct. 12, 2021

(54) APPARATUS AND METHOD FOR PROCESSING DATA PACKET IN WIRELESS COMMUNICATION SYSTEM

(71) Applicant: Samsung Electronics Co., Ltd., Gyeonggi-do (KR)

(72) Inventors: Jin Mo Sung, Seoul (KR); Tae Gu Kim, Gyeonggi-do (KR); Joon Young Heo, Gyeonggi-do (KR); Min Jung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 252 days.

(21) Appl. No.: 16/157,815

(22) Filed: Oct. 11, 2018

(65) Prior Publication Data
US 2019/0140974 A1 May 9, 2019

(30) Foreign Application Priority Data

Nov. 9, 2017 (KR) .................. 10-2017-0148419

(51) Int. Cl.
*H04L 1/00* (2006.01)
*H04L 12/925* (2013.01)
(Continued)

(52) U.S. Cl.
CPC ........ *H04L 47/722* (2013.01); *H04L 12/2801* (2013.01); *H04L 47/34* (2013.01);
(Continued)

(58) Field of Classification Search
CPC ... H04L 47/722; H04L 12/2801; H04L 69/08; H04W 28/065; H04W 88/06
See application file for complete search history.

(56) References Cited

U.S. PATENT DOCUMENTS

| 8,331,315 B2 | 12/2012 | Purkayastha et al. |
| 9,270,637 B2 | 2/2016 | Zhao |

(Continued)

FOREIGN PATENT DOCUMENTS

| EP | 2 701 430 | 2/2014 |
| EP | 3 104 661 | 12/2016 |
| WO | WO 2017/014802 | 1/2017 |

OTHER PUBLICATIONS

European Search Report dated Feb. 11, 2019 issued in counterpart application No. 18200877.1-1215, 8 pages.

(Continued)

*Primary Examiner* — Samina F Choudhry
(74) *Attorney, Agent, or Firm* — The Farrell Law Firm, P.C.

(57) ABSTRACT

An electronic device is provided. The electronic device includes a processor configured to receive first data packets via a first modem, store the first data packets in a first data buffer assigned to a first area of a volatile memory, receive second data packets via a second modem, store the second data packets in a second data buffer assigned to a second area of the volatile memory, and deliver the first data packets and the second data packets from the first data buffer and the second data buffer to an upper layer in an order in which the first data packets and the second data packets are received. The second data packets include the same internet protocol (IP) destination address as the first data packets.

17 Claims, 12 Drawing Sheets

(51) Int. Cl.
  *H04L 12/28* (2006.01)
  *H04L 29/06* (2006.01)
  *H04L 12/801* (2013.01)
  *H04W 28/08* (2009.01)
  *H04W 28/06* (2009.01)
  *H04W 88/06* (2009.01)
  *H04L 12/861* (2013.01)

(52) U.S. Cl.
  CPC ............. *H04L 69/08* (2013.01); *H04L 69/14* (2013.01); *H04W 28/08* (2013.01); *H04L 49/9057* (2013.01); *H04W 28/065* (2013.01); *H04W 88/06* (2013.01)

(56) References Cited

U.S. PATENT DOCUMENTS

| | | |
|---|---|---|
| 9,900,803 B2 | 2/2018 | Wu |
| 10,123,371 B2 | 11/2018 | Li et al. |
| 2002/0118671 A1* | 8/2002 | Staples .................. H04L 69/16 370/352 |
| 2009/0161629 A1 | 6/2009 | Purkayastha et al. |
| 2011/0069635 A1* | 3/2011 | Low .................... H04L 65/4015 370/254 |
| 2011/0170559 A1* | 7/2011 | Zhang ................ H04L 12/2861 370/442 |
| 2014/0044011 A1* | 2/2014 | Zhao ..................... H04L 61/256 370/254 |
| 2016/0366612 A1 | 12/2016 | Wu |
| 2017/0099625 A1* | 4/2017 | Li ......................... H04W 76/16 |
| 2018/0227219 A1 | 8/2018 | Zhang et al. |
| 2019/0059125 A1 | 2/2019 | Li et al. |

OTHER PUBLICATIONS

Polese, Michele et al., Improved Handover Through Dual Connectivity in 5G mmWave Mobile Networks, IEEE Journal on Selected Areas in Communications, . . . vol. 35, Issue: 9, Sep. 2017, pp. 2069-2084.

* cited by examiner

APPARATUS AND METHOD FOR PROCESSING DATA PACKET IN WIRELESS COMMUNICATION SYSTEM

CROSS-REFERENCE TO RELATED APPLICATION(S)

This application is based on and claims priority under 35 U.S.C. § 119 to Korean Patent Application Serial No. 10-2017-0148419, filed on Nov. 9, 2017, in the Korean Intellectual Property Office, the entire disclosure of which is incorporated herein by reference.

BACKGROUND

1. Field

The present disclosure relates generally to an apparatus and method, and more particularly to an apparatus and method for processing data packets in a wireless communication system.

2. Description of the Related Art

Since the appearance of a 4th generation (4G) network system, research has been conducted on a 5th generation (5G) network system which transmits and receives signals in a very high frequency mmWave band to meet the demand for wireless data traffic. An electronic device which supports a 4G network and a 5G network may switch connection between the 4G network and the 5G network to meet a high data transmission and reception speed. When the connection of the 5G network is unstable, the electronic device may switch from the 5G network to the 4G network.

While a switching operation between a 4G network and a 5G network is performed, a link between an electronic device and a network may be disconnected due to a delay and the electronic device may fail to continue providing a service. Further, since software modules which perform a function of a network layer are implemented independently of each of the 4G network and the 5G network, data packets received from the 4G network and data packets received from the 5G network may be hastily delivered to an upper layer. In this case, a sequence of data packets may fail to be ensured.

SUMMARY

The present disclosure has been made to address at least the disadvantages described above and to provide at least the advantages described below.

Aspects of the present disclosure address at least the above-mentioned problems and/or disadvantages and provide at least the advantages described below. Accordingly, an aspect of the present disclosure is to provide an apparatus for seamlessly performing a switching operation between a 4G network and a 5G network at one electronic device (e.g., a terminal), and controlling data packets received from a plurality of networks in a single manner, and methods thereof. The electronic device may prevent deterioration in performance, such as re-ordering and re-transmission of a data packet, from being generated upon network switching and may provide continuity of a data service to a user by controlling data packets received from different networks in a single manner.

In accordance with an aspect of the present disclosure, an electronic device is provided. The electronic device includes a first modem configured to support wireless communication for a first network, a second modem configured to support wireless communication for a second network, a processor configured to be electrically connected with the first modem and the second modem, a volatile memory configured to be electrically connected with the processor, and a nonvolatile memory configured to be electrically connected with the processor and include instructions. The instructions, when executed, cause the processor to receive first data packets via the first modem, store the first data packets in a first data buffer assigned to a first area of the volatile memory, receive second data packets via the second modem, store the second data packets in a second data buffer assigned to a second area of the volatile memory, and deliver the first data packets and the second data packets from the first data buffer and the second data buffer to an upper layer in an order in which the first data packets and the second data packets are received. The second data packets include the same internet protocol (IP) destination address as the first data packets.

In accordance with an aspect of the present disclosure, an electronic device is provided. The electronic device includes a first communication processor configured to provide first wireless communication based on a first protocol, a second communication processor configured to provide second wireless communication based on a second protocol, an application processor configured to be operatively connected with the first communication processor and the second communication processor, a volatile memory configured to be operatively connected with the application processor, and a nonvolatile memory configured to be operatively connected with the application processor. The nonvolatile memory includes instructions that, when executed, cause the application processor to receive a first sequence of first data packets from a first network through the first communication processor, each of the first data packets including a first destination address, store the first data packets at first addresses on the volatile memory, receive a second sequence of second data packets from a second network through the second communication processor, each of the second data packets including the first destination address, store the second data packets at second addresses on the volatile memory, and store the first addresses and the second addresses at third addresses on the volatile memory.

In accordance with an aspect of the present disclosure, an electronic device is provided. The electronic device includes a first communication processor configured to provide first wireless communication based on a first protocol, a second communication processor configured to provide second wireless communication based on a second protocol, an application processor configured to be operatively connected with the first communication processor and the second communication processor, a volatile memory configured to be operatively connected with the application processor, and a nonvolatile memory configured to be operatively connected with the application processor. The nonvolatile memory includes instructions that, when executed, cause the application processor to receive a first sequence of first data packets from a first network through the first communication processor, store the first data packets at first addresses on the volatile memory, receive a second sequence of second data packets from a second network through the second communication processor, store the second data packets at second addresses on the volatile memory, store the first addresses and the second addresses at third addresses on the volatile memory, and provide a network device interface which uses the first addresses and the second addresses stored at the third addresses.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
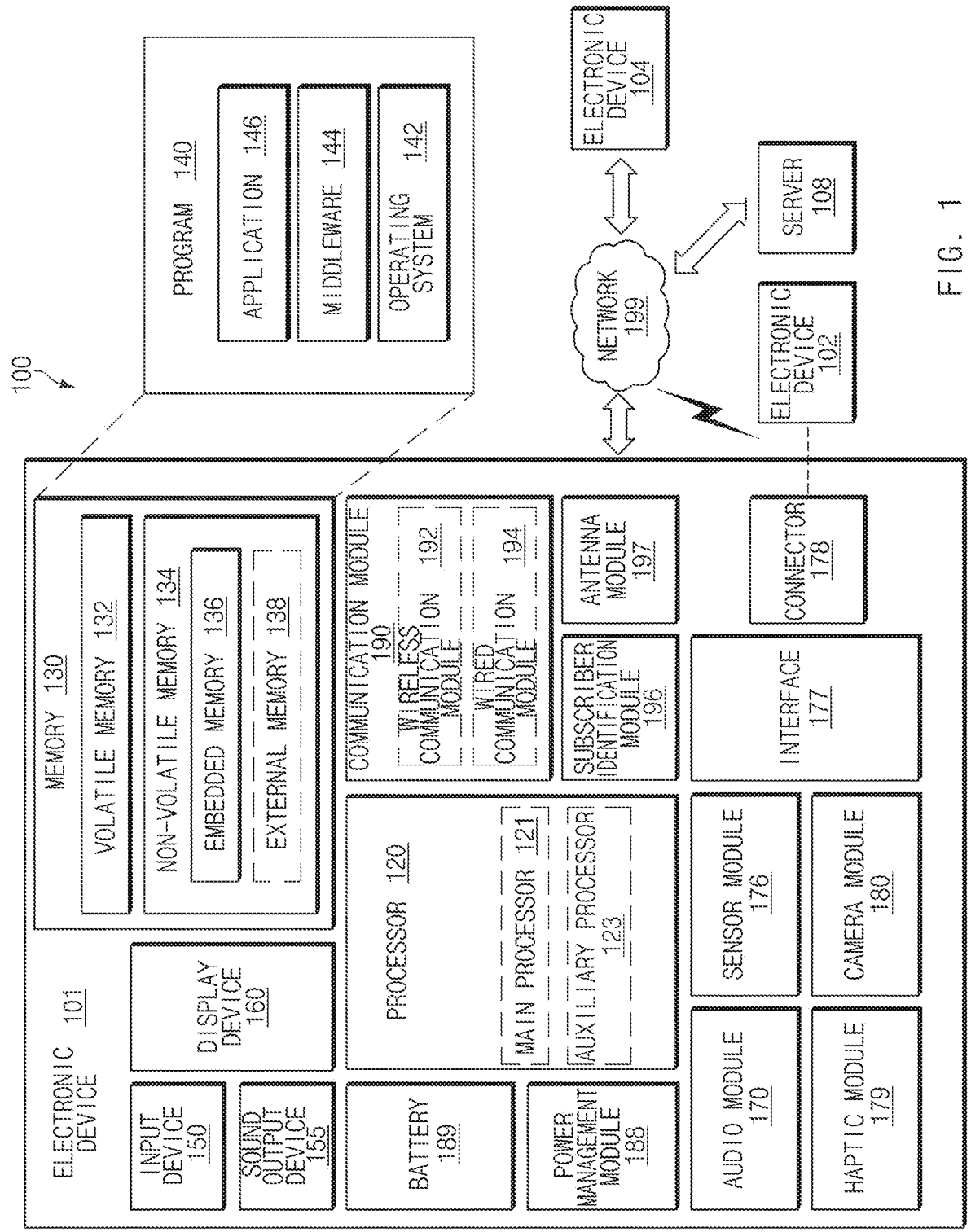
FIG. 1 is a diagram of a configuration of an electronic device in a network environment, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a diagram of a configuration of an electronic device in a network environment, according to an embodiment.

Referring to FIG. 1, an electronic device 101 may communicate with an electronic device 102 through a network 198 (e.g., a short-range wireless communication) or may communicate with an electronic device 104 or a server 108 through a network 199 (e.g., a long-distance wireless communication) in a network environment 100. The electronic device 101 may communicate with the electronic device 104 through the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. At least one among components of the electronic device 101 may be omitted or other components may be added to the electronic device 101. Some components may be integrated and implemented as in the case where the sensor module 176 (e.g., a fingerprint sensor, an iris sensor, or an illuminance sensor) is embedded in the display device 160 (e.g., a display).

The processor 120 may operate software (e.g., a program 140) to control at least one of other components (e.g., a hardware or software component) of the electronic device 101 connected to the processor 120 and may process and compute a variety of data. The processor 120 may load a command set or data, which is received from other components, into a volatile memory 132, may process the loaded command or data, and may store result data into a nonvolatile memory 134. The processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. The auxiliary processor 123 may operate separately from the main processor 121 or embedded.

The auxiliary processor 123 may control at least some of functions or states associated with at least one component among the components of the electronic device 101 instead of the main processor 121 while the main processor 121 is in an inactive (e.g., sleep) state or together with the main processor 121 while the main processor 121 is in an active (e.g., an application execution) state. The auxiliary processor 123 may be implemented as a part of another component that is functionally related to the auxiliary processor 123. The memory 130 may store a variety of data used by at least one component of the electronic device 101, such as software, and input data or output data with respect to commands associated with the software. The memory 130 may include the volatile memory 132 or the nonvolatile memory 134.

The program 140 may be stored in the memory 130 as software and may include an operating system 142, a middleware 144, or an application 146.

The input device 150 may be a device for receiving a command or data, which is used for a component of the electronic device 101, from an outside (e.g., a user) of the electronic device 101 and may include a microphone, a mouse, or a keyboard.

The sound output device 155 may be a device for outputting a sound signal to the outside of the electronic device 101 and may include a speaker used for general purposes, such as multimedia play or recordings play, and a receiver used only for receiving calls. The receiver and the speaker may be either integrally or separately implemented.

The display device 160 may be a device for visually presenting information to the user and may include a display, a hologram device, or a projector and a control circuit for controlling a corresponding device. The display device 160 may include a touch circuitry or a pressure sensor for measuring an intensity of pressure on the touch.

The audio module 170 may convert a sound and an electrical signal in dual directions. The audio module 170 may obtain the sound through the input device 150 or may output the sound through an external electronic device (e.g., a speaker or a headphone) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device. The interface 177 may include, for example, a high-definition multimedia interface (HDMI), a universal serial bus (USB) interface, an SD card interface, or an audio interface.

A connection terminal 178 may include a connector that physically connects the electronic device 101 to the external electronic device such as an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include a motor, a piezoelectric element, or an electric stimulator.

The camera module 180 may shoot a still image or a video image. According to an embodiment, the camera module 180 may include at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include a non-rechargeable (primary) battery, a rechargeable (secondary) battery, or a fuel cell.

The communication module 190 may establish a wired or wireless communication channel between the electronic device 101 and the external electronic device and support communication execution through the established communication channel. The communication module 190 may include at least one communication processor operating independently from the processor 120 and supporting the wired communication or the wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module) and may communicate with the external electronic device using a corresponding communication module among them through the network 198 (e.g., the short-range communication network such as a Bluetooth, a WiFi direct, or an Infrared Data Association (IrDA)) or the network 199 (e.g., the long-distance wireless communication network such as a cellular network, an internet, or a computer network (e.g., LAN or WAN)). The above-mentioned various communication modules 190 may be implemented into one chip or into separate chips, respectively.

The wireless communication module 192 may identify and authenticate the electronic device 101 using user information stored in the subscriber identification module 196 in the communication network.

The antenna module 197 may include one or more antennas to transmit or receive the signal or power to or from an external source. The communication module 190 may transmit or receive the signal to or from the external electronic device through the antenna suitable for the communication method.

Some components among the components may be connected to each other through a communication method (e.g., a bus, a general purpose input/output (GIPO), a serial peripheral interface (SPI), or a mobile industry processor interface (MIPI)) used between peripheral devices to exchange signals (e.g., a command or data) with each other.

The command or data may be transmitted or received between the electronic device 101 and the external electronic device 104 through the server 108 connected to the network 199. Each of the electronic devices 102 and 104 may be the same as or different types as or from the electronic device 101. All or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2A:
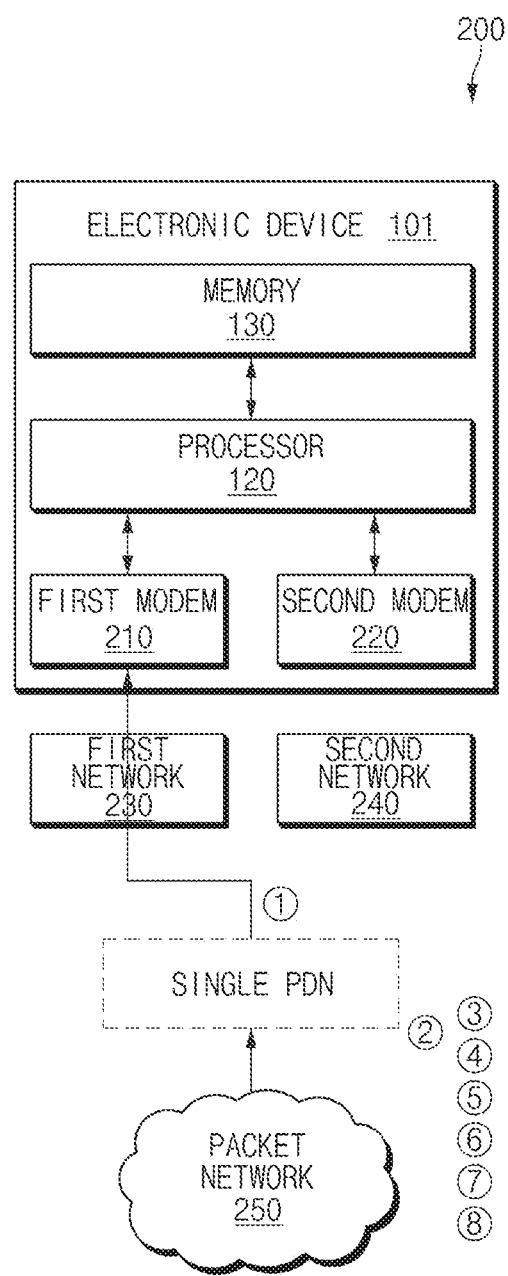
FIG. 2A is a diagram of a downlink operation of an electronic device which supports a plurality of networks, according to an embodiment.

FIG. 2A is a diagram of a downlink operation of an electronic device which supports a plurality of networks, according to an embodiment.

Referring to FIG. 2A, in a network environment 200, each of components may be one entity and may be a set of a plurality of entities. An electronic device 101 may refer to a device used by a user. The electronic device 101 may be referred to as a terminal, user equipment (UE), a mobile station, a subscriber station, a remote terminal, a wireless terminal, a user device, or another term having an equivalent technical meaning.

The network environment 200 may include a first network 230, a second network 240, and a packet network 250. The packet network 250 may provide a service (e.g., an Internet service, an IP multimedia subsystem (IMS) service, or the like) to the electronic device 101 based on an IP. Each of the first network 230 and the second network 240 may include one or more entities which communicate with the electronic device 101 over a wired/wireless channel. Each of the first network 230 and the second network 240 may include at least one of a base station (e.g., an access point, an eNodeB (eNB), a 5G node, a wireless point, a transmission/reception point (TRP), a 5G NodeB (5GNB), or another term having an equivalent technical meaning) capable of providing radio access to the electronic device 101, a mobility management entity (MME) capable of performing various control functions associated with mobility of the electronic device 101, a gateway (GW) capable of setting a bearer for transmitting and receiving data with the electronic device 101, and a home subscriber server (HSS) capable of storing key information for authentication of the electronic device 101 and a profile of a subscriber.

Each of the first network 230 and the second network 240 may include a 4G network and a 5G network. The 4G network may support a long term evolution (LTE) protocol defined in $3^{rd}$ generation partnership project (3GPP). The 5G network may support, for example, a new radio (NR) protocol defined in the 3GPP.

A system of the first network 230 and a system of the second network 240 may be operated independently of each other (referred to as standalone (SA) mode). The system of the second network 240 may be operated as an auxiliary system of the system of the first network 230 (referred to as non-standalone (NSA) mode). When the first network 230 and the second network 240 are operated in the SA mode, they may use inter radio access technology (IRAT) interworking.

The electronic device 101 may access a single (the same) packet data network (PDN) to continue receiving a service from the 4G network and the 5G network. The 4G network and/or the 5G network may assign an IP address(s) for a PDN connection to the electronic device 101. The electronic device 101 may perform a handover between the 4G network and the 5G network and may perform data communication using a single IP address over one PDN connection (or by accessing the same PDN). The electronic device 101 may access the same PDN over a PDN connection independent of the 4G network and the 5G network to receive a single IP address or an independent IP address and may perform data communication.

The electronic device 101 may include a first modem 210, a second modem 220, a processor 120, and a memory 130. Although not illustrated in FIG. 2A, the electronic device 101 may further include an interface for supporting interchip communication between the first modem 210 (or the second modem 220) and the processor 120.

Each of the first modem 210 and the second modem 220 may provide an interface for communicating with other entities. The first modem 210 may support wireless communication for the first network 230. The second modem 220 may support wireless communication for the second network 240. The first modem 210 or the second modem 220 may include a communication processor (CP). The first modem 210 or the second modem 220 and the processor 120 may be configured as one module. In other words, the first modem 210 or the second modem 220 may be integrally formed with the processor 120. When communicating with the second network 240 via the second modem 220, the electronic device 101 may transmit or receive a signal of a higher frequency band (e.g., 28 GHz) than the first network 230.

The memory 130 may be configured as a volatile memory, a nonvolatile memory, or a combination thereof. The memory 130 may store a basic program, an application program, or data such as configuration information, for an operation of the electronic device 101. The memory 130 may provide the stored data depending on a request of the processor 120. The memory 130 may include commands (or instructions) for causing the processor 120 to control an overall operation of the electronic device 101.

The processor 120 may include an AP. The processor 120 may control an overall operation of the electronic device 101. The processor 120 may process data packets (e.g., data packets ① to ⑧) received via the first modem 210 or the second modem 220 by executing instructions included in the memory 130. The processor 120 may control switching between the first network 230 and the second network 240 by executing instructions.

Figure 2B:
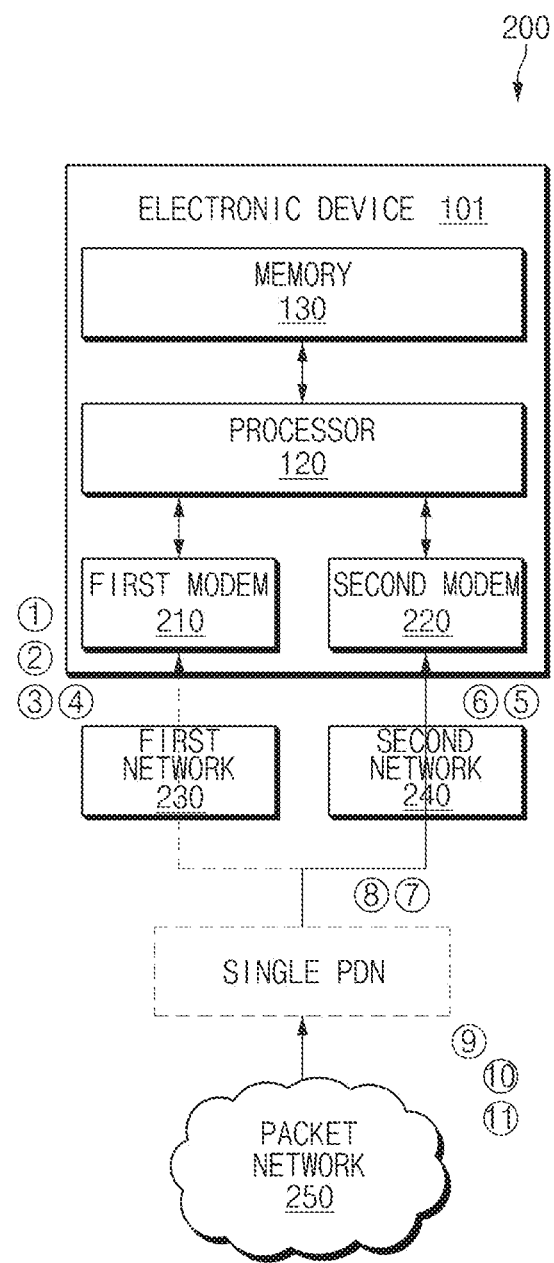
FIG. 2B is a diagram of a network switching operation of an electronic device which supports a plurality of networks, according to an embodiment.

FIG. 2B is a diagram of a network switching operation of an electronic device which supports a plurality of networks, according to an embodiment. FIG. 2B illustrates when an electronic device 101 switches from a first network 230 to a second network 240. However, the same principle is applicable when the electronic device 101 switches from the second network 240 to the first network 230.

Referring to FIG. 2B, in a network environment 200, while receiving data packets (referred to as first data packets or sequence of first data packets) transmitted from a packet network 250 over the first network 230 using a first modem 210, the electronic device 101 may determine whether to switch a network depending on various causes (e.g., when receiving a message for commanding to be switched from the first network 230 or the second network 240, when the electronic device 101 detects a wireless channel state, or when the electronic device 101 receives a user input for changing a network). When a network connected to the electronic device 101 is switched, the electronic device 101 may receive data packets (e.g., data packets ⑤ to ⑧) subsequent to first data packets (e.g., data packets ① to ④), received via the first modem 210, via a second modem 220. Data packets received from the second network 240 via the second modem 220 may be referred to as second data packets or a sequence of the second data packets.

Since the electronic device 101 is in a state where it is connected to the first network 230 and the second network 240 through a single IP address, it may continue receiving downlink data seamlessly irrespective of network switching.

Figure 2C:
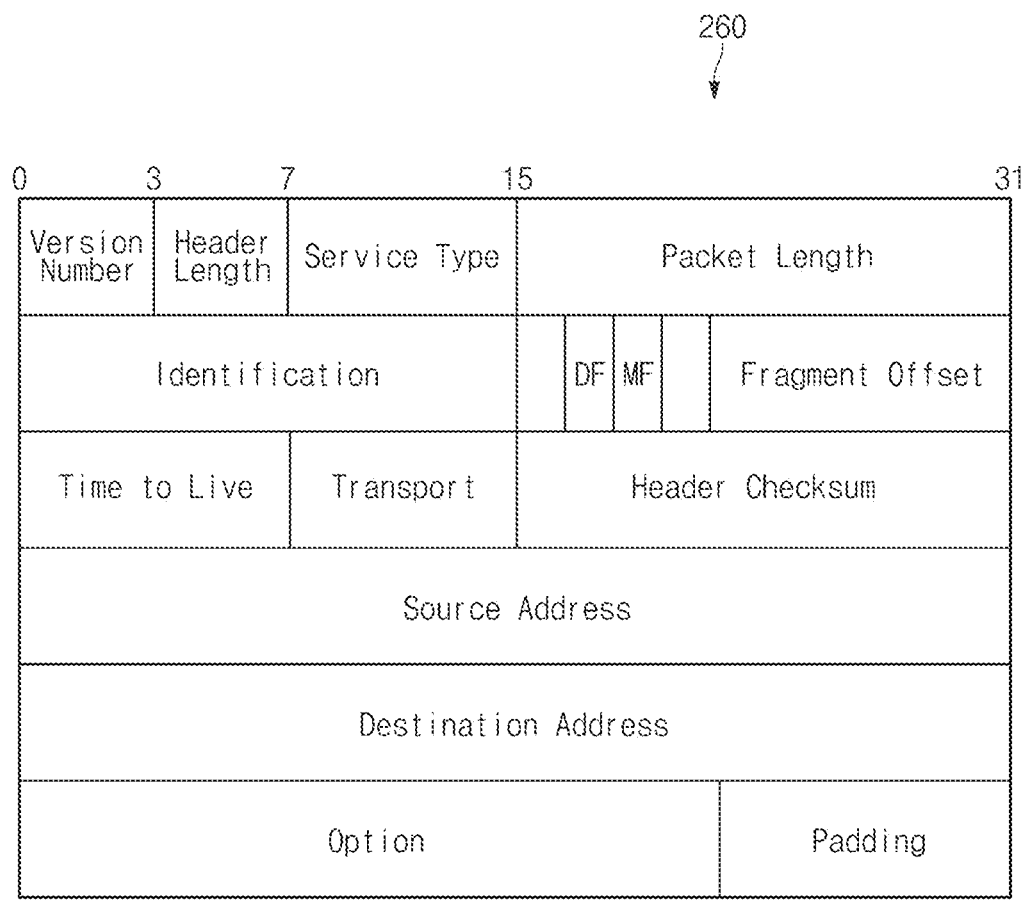
FIG. 2C is a diagram of a structure of an internet protocol (IP) header, according to an embodiment.

FIG. 2C is a diagram of a structure of an internet protocol (IP) header, according to an embodiment. A structure of an IP header upon reception of downlink data is described below, but the same principle is applicable to a structure of an IP header upon transmission of uplink data.

Referring to FIG. 2C, in an IP header 260, a version number may indicate a version (e.g., an IPv4 or an IPv6) of an IP. A header length may indicate a length of the IP header 260 in an IP packet. A service type may indicate how fast a data packet is processed or how fast a data packet is transmitted. A packet length may indicate the entire length of the IP packet. When one data packet is divided into several fragments, an identification may indicate information assigned to distinguish each fragment. Each of a DF and an MF may be flag data indicating control information about division of the data packet. A fragment offset may indicate whether a corresponding fragment belongs to any IP packet. A time to live (TTL) may indicate a time when a corresponding data packet is available. A transport may indicate that a protocol of an upper layer of the IP packet is a transport layer. In FIG. 2C, the upper layer of the IP packet is displayed as the transport layer, but information indicating another upper layer (e.g., a user datagram protocol (UDP)) may be displayed. A header checksum may include information for verifying whether an error of a header occurs. A source address (or an IP source address) may indicate an IP address for a source of the data packet. A destination address (or an IP destination address) may indicate an IP address for a destination of the data packet.

Since an electronic device 101 of FIG. 2A is connectable to a first network 230 and a second network 240 of FIG. 2A through a single IP address, when downlink data occur, a destination address included in an IP header of first data packets the electronic device 100 receives from the first network 230 may be the same as a destination address included in an IP header of second data packets the electronic device 101 receives from the second network 240. When uplink data occurs, a source address included in an IP header of data packets the electronic device 101 transmits to the first network 230 may be the same as a source address included in an IP header of data packets the electronic device 101 transmits to the second network 240.

Figure 3:
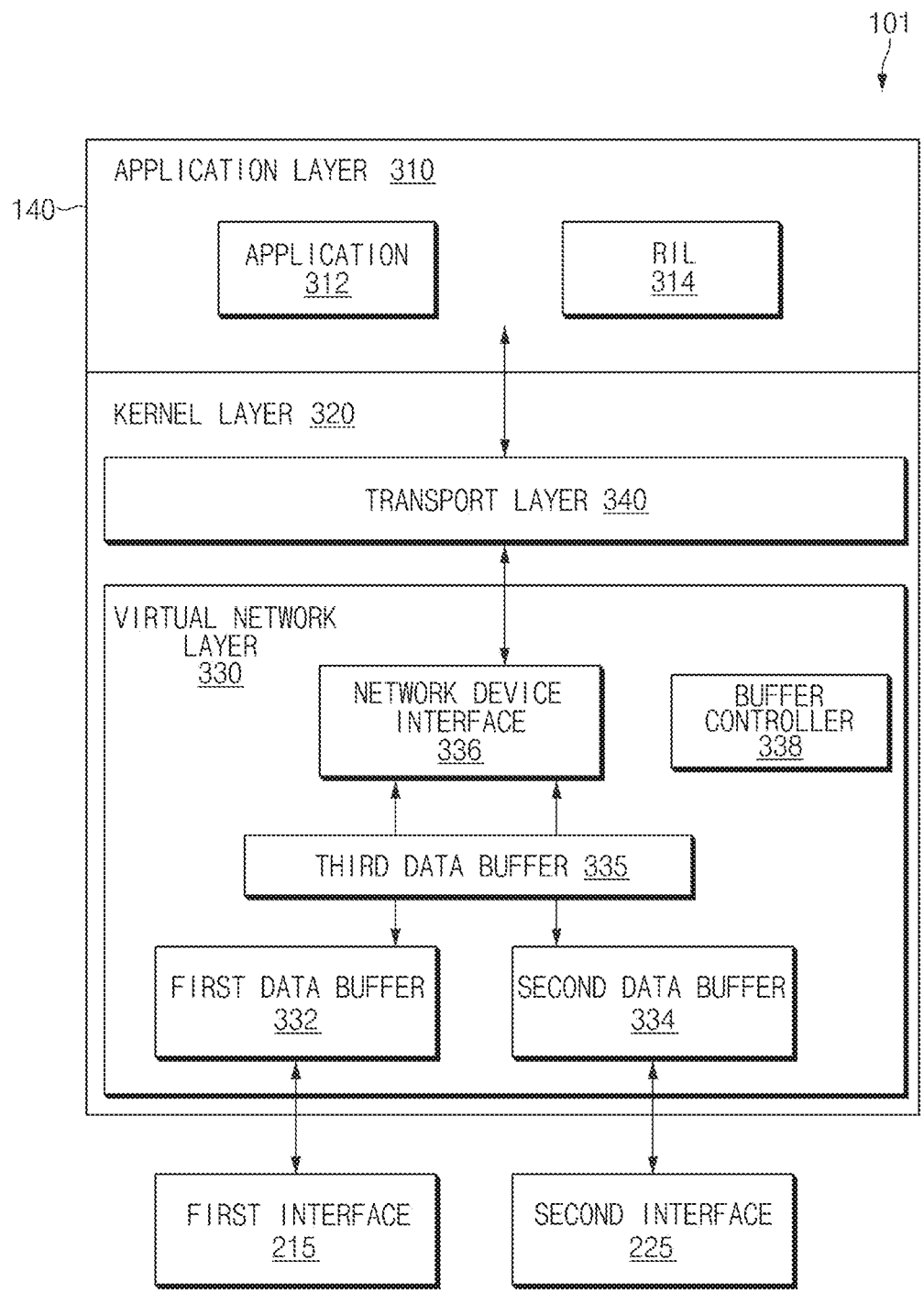
FIG. 3 is a diagram of a structure of layers in which data packets are processed, according to an embodiment.

FIG. 3 is a diagram of a structure of layers in which data packets are processed, according to an embodiment.

Referring to FIG. 3, in an electronic device 101, data packets received via a first modem or a second modem may be delivered to a processor through a first interface 215 or a second interface 225. When instructions stored in a memory is executed by the processor, the data packets may be processed by a program 140.

The first interface 215 may be an interface for supporting inter-chip communication between the processor and the first modem 210. The first interface 215 may include a shared memory (shemem) interface. The second interface 225 may be an interface for supporting inter-chip communication between the processor and the second modem 220. The second interface 225 may include a peripheral component interconnect express (PCIe) interface. The second interface 225 may differ in data packet processing speed from the first interface 215.

The program 140 may be referred to as software or a module. The program 140 may include an application layer 310 and a kernel layer 320.

The application layer 310 may include an application 312 and a radio interface layer (RIL) 314. The application 312 may perform a function of providing various services (e.g., an IMS service, an Internet service, or the like), provided from a packet network to a user. The RIL 314 may provide an interface associated with wireless communication between software and hardware. The RIL 314 may determine whether to switch a network connected to the electronic device 101. The RIL 314 may determine whether to switch the network, by receiving a switching request information from the first modem 210 or the second modem 220 or in response to a user input.

The kernel layer 320 may be included in an operating system. The kernel layer 320 may include a transport layer 340 and a virtual network layer 330. The virtual network layer 330 may include a network device interface 336, a first data buffer 332, and a second data buffer 334.

Each of the first data buffer 332 and the second data buffer 334 may be a space assigned to the memory. The first data buffer 332 may be assigned to a predetermined area (referred to as first area) of the memory by the processor, and the second data buffer 334 may be assigned to another area (referred to as second area) of the memory by the processor. Since a speed at which first data packets are received may differ from a speed at which second data packets are received, a size of the first data buffer 332 (i.e., memory capacity assigned to the first data packet 332) may differ from a size of the second data buffer 334.

The network device interface 336 may be an interface for delivering the first data packets and the second data packets to an upper layer. The first electronic device 101 may switch between the first network 230 and the second network 240 more quickly and seamlessly by establishing a single PDN with the first network 230 and the second network using the single network device interface 336.

The transport layer 340 may include a transmission control protocol (TCP), a user datagram protocol (UDP), or an IP. In a downlink operation, the transport layer 340 may deliver data, delivered from the virtual network layer 330, to an upper layer (e.g., the application layer 310). In an uplink operation, the transport layer 340 may deliver data, delivered from the application layer 310, to a lower layer (e.g., the virtual network layer 330).

A buffer controller 338 may be a software module for controlling the first data buffer 332 and the second data buffer 334 in a single manner depending on a network connected to the electronic device 101. The buffer controller 338 may be a set of instructions stored in the memory 130.

When the instructions stored in the memory are executed, the buffer controller 338 may store first data packets received via the first modem 210 and the first interface 215 in the first data buffer 332. The buffer controller 338 may use a memory address (referred to as first address) corresponding to the first data packets to store the first data packets in the first data buffer 332. The first address may be point information (e.g., a read point or a write point) used to call (or read) the first data packets from the first data buffer 332. When the network connected to the electronic device 101 switches from a first network to a second network, the buffer controller 338 may store second data packets received via the second modem 220 and the second interface 225 in the second data buffer 334. The buffer controller 338 may use a memory address (referred to as second address) corresponding to the second data packets to store the second data packets in the second data buffer 334.

The buffer controller 338 may control the first data buffer 332 and the second data buffer 334 such that the first data packets and the second data packets are delivered to an upper layer in the order received from the packet network 250. The buffer controller 338 may use a separate third data buffer 335 for managing the first data buffer 332 and the second data buffer 334 in a single manner. The buffer controller 338 may store address values at which data packets are stored in the first data buffer 332 and the second data buffer 334 in the third data buffer 335. The network device interface 336 may deliver received data packets to an upper layer in order by accessing the address values stored in the third data buffer 335.

Figure 4:
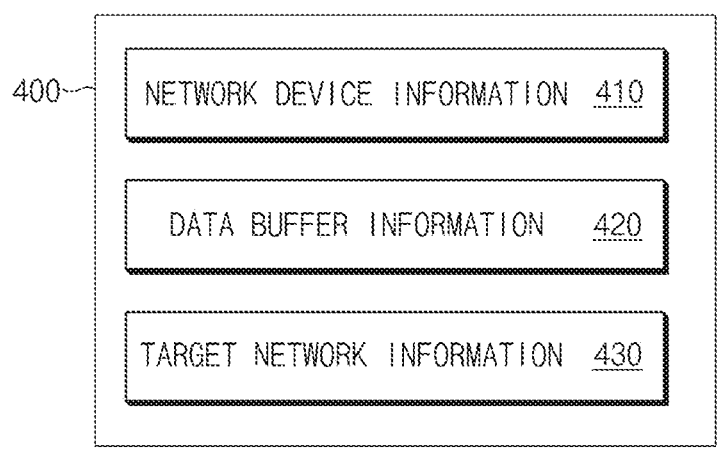
FIG. 4 is a diagram of information managed by a buffer controller to control data buffers in a single manner, according to an embodiment.

FIG. 4 is a diagram of information managed by a buffer controller to control data buffers in a single manner, according to an embodiment. Each of a plurality of information shown in FIG. 4 may be information managed by a buffer controller to control a first data buffer and a second data buffer in a single manner.

Referring to FIG. 4, information 400 managed by the buffer controller may be generated before data buffers respectively corresponding to modems are defined after an electronic device is booted. In other words, the information 400 may be an instance generated in a memory while the electronic device is booted (or after the electronic device is booted). The buffer controller may include at least one of network device interface information 410, data buffer information 420, and target network information 430.

The network device interface information 410 may be information indicating a network device interface corresponding to data buffers controlled by the buffer controller. The data buffer information 420 may be information including at least one of a size, a processing speed, or point information (e.g., a read point or a write point) of each of data buffers respectively corresponding to modems or a size, a processing speed, or point information (e.g., a read point or a write point) of a third data buffer for controlling the data buffers in a single manner. The data buffer information 420 may include different information depending on an uplink and a downlink. The target network information 430 may be information indicating a type of a network connected to the electronic device.

Figure 5:
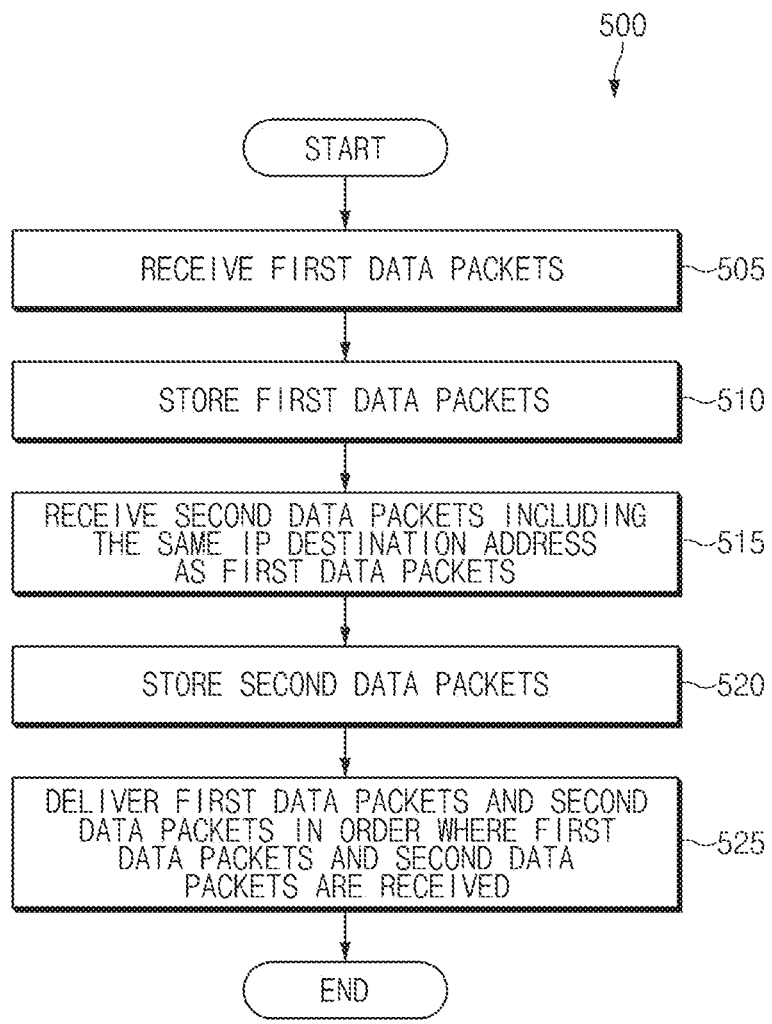
FIG. 5 is a flowchart for an operation of an electronic device for controlling data buffers in a single manner in a downlink situation, according to an embodiment.

FIG. 5 is a flowchart for an operation of an electronic device for controlling data buffers in a single manner in a downlink situation, according to an embodiment. Operations described below may be executed by an electronic device or may be executed by a processor based on instructions included in a memory.

Referring to FIG. 5, at step 505 of a method 500, the processor may receive first data packets from a first network through a first modem. An IP header included in each of the first data packets may include a destination address indicating an IP address of the electronic device.

At step 510, the processor may store the received first data packets in a first data buffer, assigned to a first area of the memory. The processor may store the first data packets in the first data buffer through a first address used to read the first data packets.

At step 515, the processor may receive second data packets from a second network through a second modem. A destination address included in an IP header of each of the second data packets may be the same as a destination address included in the IP header of each of the first data packets.

At step 520, the processor may store the received second data packets in a second data buffer, assigned to a second area different from the first area. The processor may store the second data packets in the second data buffer through a second address used to read the second data packets.

The order of the operations is not limited to the order shown in FIG. 5. When the electronic device is connected to the second network and switches to the first network, the electronic device may first receive and store second data packets and may then receive and store first data packets.

At step 525, the processor may respectively deliver the first data packets and the second data packets from the first data buffer and the second data buffer to an upper layer in an order in which the first data packets and the second data packets are received. When the electronic device switches from the first network to the second network, the processor may first deliver the first data packets. The processor may store a first address value and a second address value in a third data buffer in an order where data packets are received and may deliver the data packets in an order of address values stored in the third data buffer.

Through the above-described method 500, the electronic device may prevent data from being missed by obtaining continuity of a data packet delivered to the upper layer. The electronic device may reduce re-ordering or re-transmission of the data packet by obtaining the continuity of the data packet and may continue serving a user.

Figure 6:
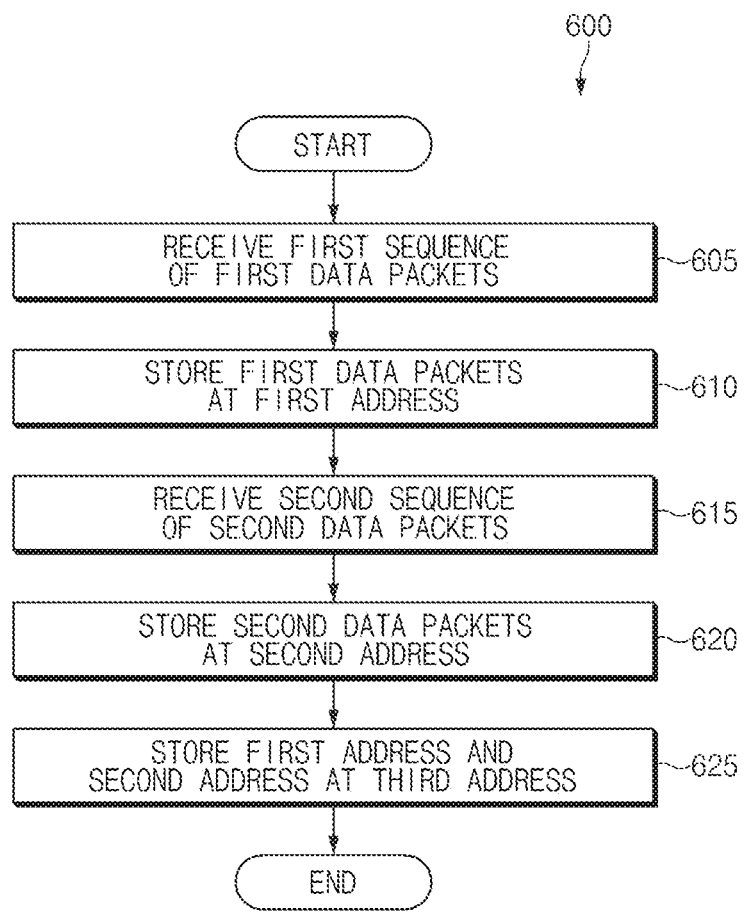
FIG. 6 is a flowchart for an operation of an electronic device for storing an address of data packets in a downlink situation, according to an embodiment.

FIG. 6 is a flowchart for an operation of an electronic device for storing an address of data packets in a downlink situation, according to an embodiment. Operations described below may be executed by an electronic device or may be executed by a processor based on instructions included in a memory.

Referring to FIG. 6, at step 605 of a method 600, the processor may receive a first sequence of first data packets. The processor may receive the first sequence from a first network via a first communication processor configured to provide wireless communication based on a first protocol (e.g., a 4G protocol). Each of the first data packets may include a first destination address.

At step 610, the processor may store the first data packets at a first address on a volatile memory. The first address may indicate an area of a first data buffer assigned to the memory.

At step 615, the processor may receive a second sequence of second data packets. The processor may receive the second sequence from a second network via a second communication processor configured to provide wireless communication based on a second protocol (e.g., a 5G protocol). Each of the second data packets may include a first destination address.

At step 620, the processor may store the second data packets at a second address on the volatile memory. The second address may indicate an area of a second data buffer assigned to the memory.

At step 625, the processor may store the first address and the second address at a third address on the volatile memory. The third address may indicate an area of a third data buffer different from the first data buffer and the second data buffer on the memory. The order where respective operations are implemented is not limited to the order shown in FIG. 6. For example, when the first sequence is received, the processor may store the first address at the third address concurrently with storing the first data packets at the first address. In the same principle, when the second sequence is received, the processor may store the second address at the third address concurrently with storing the second data packets at the second address.

Figure 7:
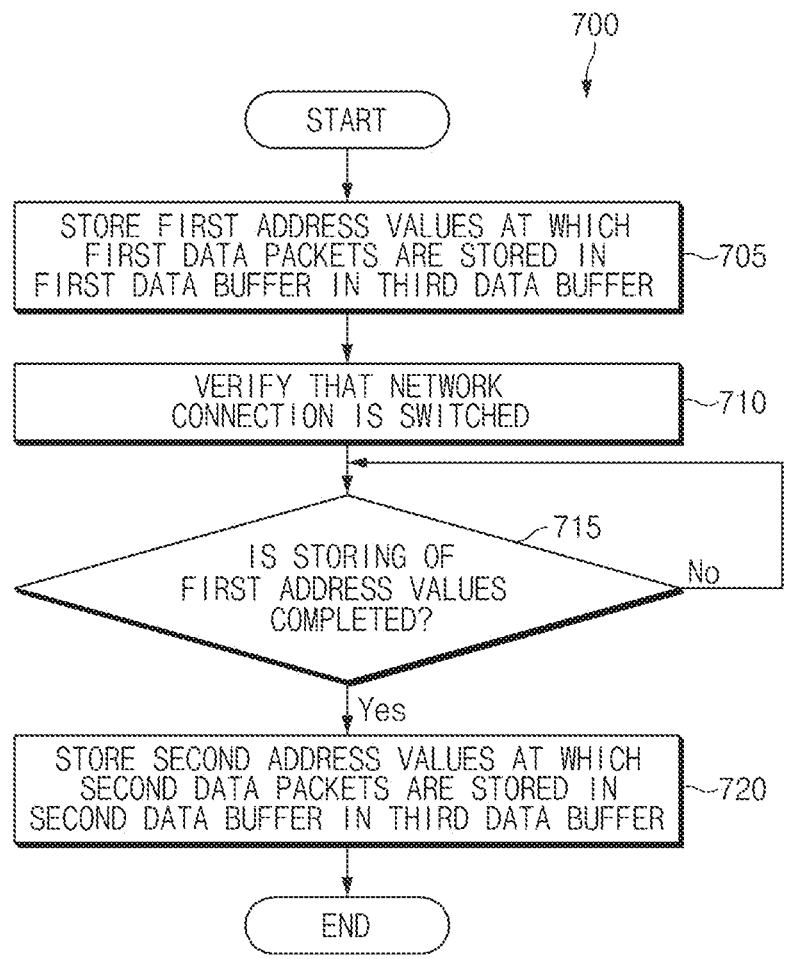
FIG. 7 is a flowchart of an operation of an electronic device for controlling data buffers in a single manner as a network connection is switched in a downlink situation, according to an embodiment.

FIG. 7 is a flowchart for an operation of an electronic device for controlling data buffers in a single manner as a network connection is switched in a downlink situation, according to an embodiment. Operations described below may be executed by an electronic device or may be executed by a processor based on instructions included in a memory.

Referring to FIG. 7, at step 705 of a method 700, the processor may store first address values at which first data packets are stored in a first data buffer in a third data buffer.

At step 710, the processor may verify that a network connected to the electronic device switches from a first network to a second network. The processor may receive network switching request information from an upper layer. The upper layer may determine whether to switch the network, by receiving switching request information from a first modem or a second modem or in response to a user input.

At step 715, the processor may determine whether all the first address values are stored in the third data buffer. The processor may determine whether all the first address values are stored in the third data buffer, by verifying the number of first data packets which remain in the first data buffer based on at least one of a size or a processing speed of the first data buffer or a speed at which the first data packets are delivered from the first modem to the first data buffer.

At step 720, in response to storing all the first address values in the third data buffer, the processor may store second address values at which second data packets are stored in a second data buffer in the third data buffer. As the processor does not store the second address values in the third data buffer until the storing of the first address values is completed in the third data buffer, the first data packets and the second data packets may be delivered to an upper layer in an order where they are received in the electronic device.

Figure 8:
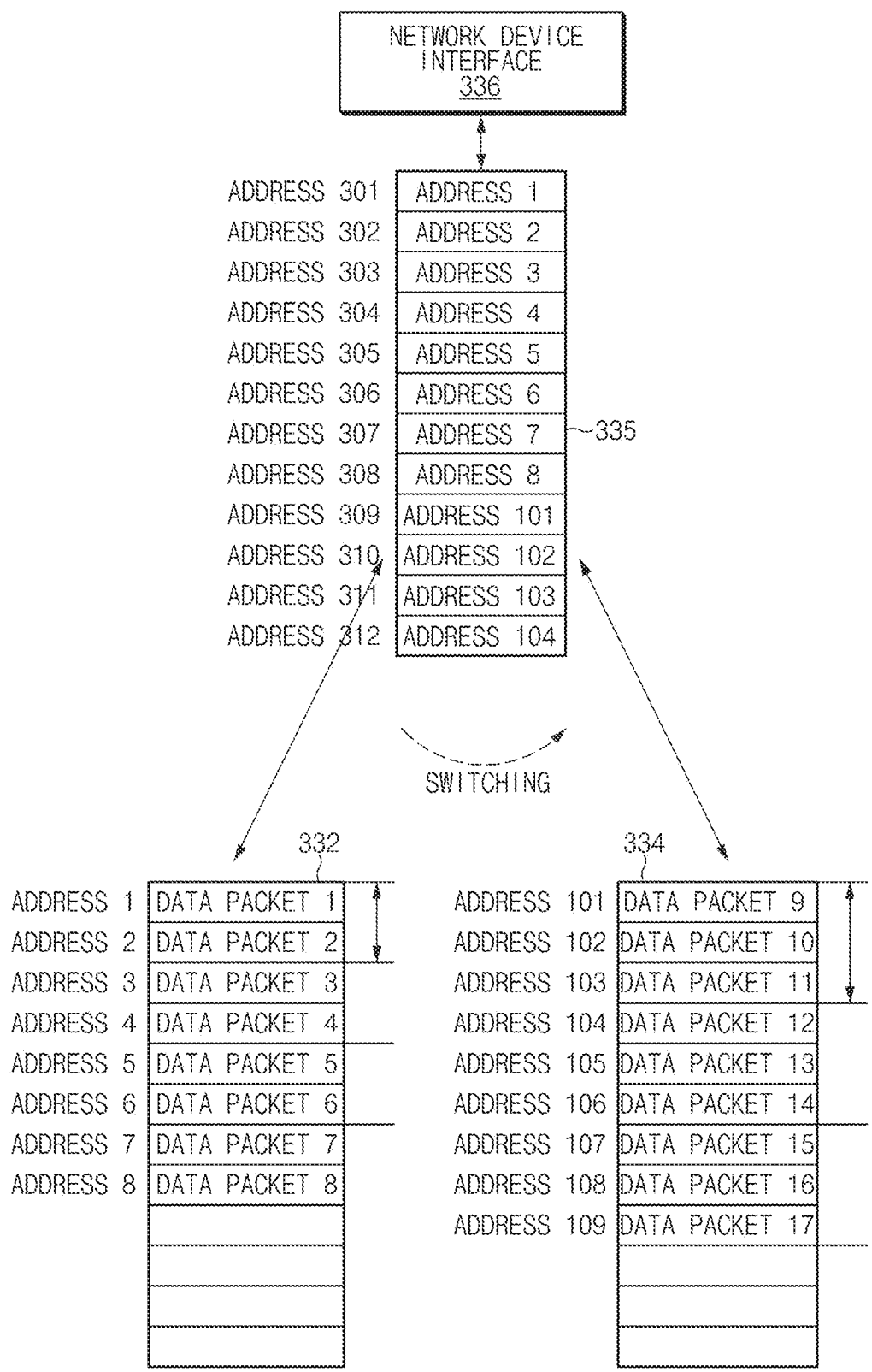
FIG. 8 is a diagram of a structure of each of a first data buffer, a second data buffer, and a third data buffer, according to an embodiment.

FIG. 8 is a diagram of a structure of each of a first data buffer, a second data buffer, and a third data buffer, according to an embodiment. Each of the data buffers shown in FIG. 8 may be a memory space where an electronic device processes data packets received from a packet network.

Referring to FIG. 8, a first data buffer 332 and a second data buffer 334 may be respectively connected with a first interface corresponding to a first modem and a second interface corresponding to a second modem. Since a speed at which data packets are delivered through the first interface differs from a speed at which the data packets are delivered through the second interface, an amount (or the number) of data packets stored in the first data buffer 332 during the same time (or timing) may differ from an amount (or the number) of data packets stored in the second data buffer 334 during the same time (or timing). As shown in FIG. 8, the number of first data packets stored in the first data buffer 332 during a constant time is 2, whereas the number of second data packets stored in the second data buffer 334 during the same time is 3.

The processor may verify the number of data packets which remain in the first data buffer 332 or the second data buffer 334, based on the number of data packets received by the first data buffer 332 or the second data buffer 334 and a processing speed of the first data buffer 332 or the second data buffer 334 (i.e., a speed at which data packets are delivered to an upper layer). While data packets 1 to 8 are stored at addresses 1 to 8 of the first data buffer 332 and while information about the stored data packets 1 to 8 (e.g., information about addresses 1 to 8 and/or information about a size of a data packet) is delivered to a third data buffer 335, the electronic device may switch to a second network (although not illustrated in FIG. 8, it may be assumed that the electronic device switches to the second network in a state where data packets 4 to 8 remain). The processor may store data packets 9 to 17 received from the second network at addresses 101 to 109 of the second data buffer 334. In a state where data packets 4 to 8 remain, when the processor first delivers values of addresses 101 to 109 at which data packets 9 to 17 are stored to the third data buffer 335, a data packet may be missed on an upper layer. The processor may deliver values of addresses 4 to 8 which remain in the first data buffer 332 to the third data buffer 335 without delivering the values of addresses 101 to 109 to the third data buffer 335. When the values of addresses 4 to 8 are delivered to the third data buffer 335, the processor may deliver the values of addresses 101 to 109 to the third data buffer 335. Through the above-mentioned method, the processor may store the values of addresses 1 to 8 and addresses 101 to 109 in the third data buffer 335 in order. A network device interface 336 may deliver data packets respectively stored in the first data buffer 332 and the second data buffer 334 to an upper layer in order, based on address values stored in order in the third data buffer 335.

Figure 9:
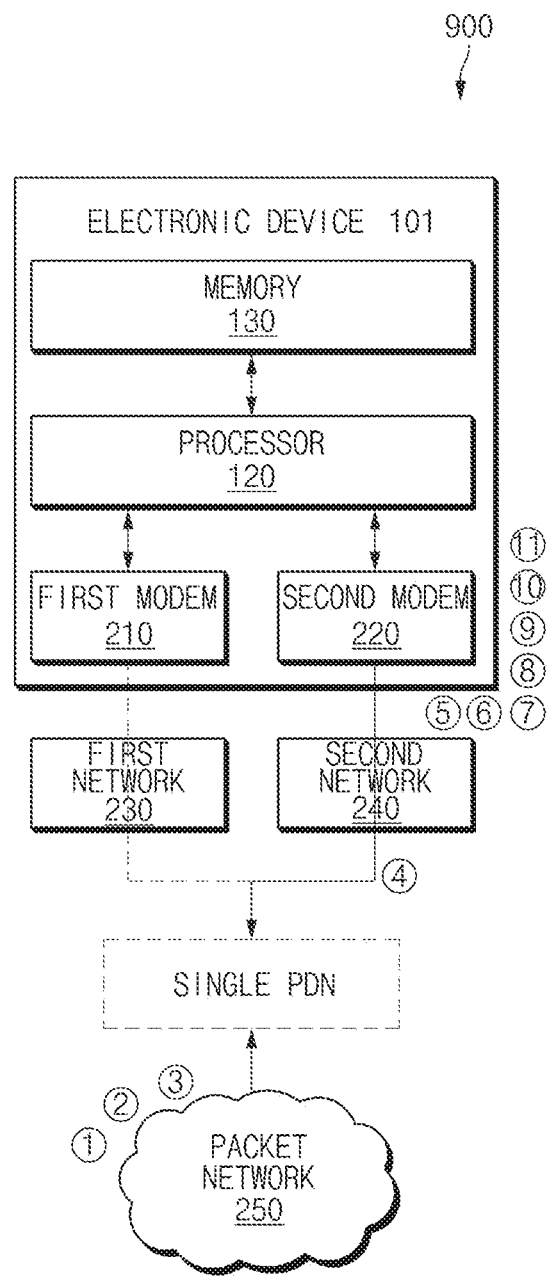
FIG. 9 is a diagram of an uplink operation of an electronic device which supports a plurality of networks, according to an embodiment.

FIG. 9 is a diagram of an uplink operation of an electronic device which supports a plurality of networks, according to an embodiment. FIG. 9 illustrates a network environment in which an electronic device 101 switches from a first network 230 to a second network 240. However, the sample principle is applicable to an embodiment in which the electronic device 101 switches from the second network 240 to the first network 230.

Referring to FIG. 9, in a network environment 900, while transmitting data packets to the first network 230 via a first modem 210, the electronic device 101 may determine whether to switch a network, based on various causes (e.g., when receiving a message for switching from the first network 230, when detecting a wireless channel state, or when receiving a user input for changing the network). When the network is switched, the electronic device 101 may transmit data packets (e.g., data packets ④ to ⑦ of FIG. 9) subsequent to data packets (e.g., data packets ① to ③ of FIG. 9) transmitted via the first modem 210, through a second modem 220.

Data packets transmitted via the first modem 210 may include the same IP source address as data packets transmitted via the second modem 220. When communicating with the second network 240, the electronic device 101 may transmit a signal of a higher frequency band (e.g., 28 GHz) than the first network 230.

Figure 10:
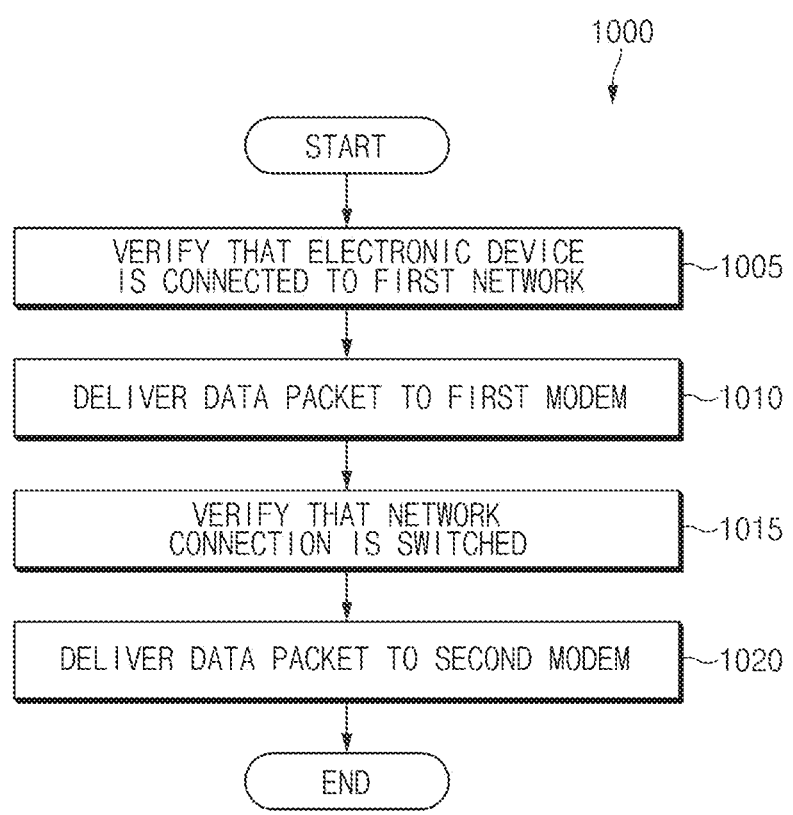
FIG. 10 is a flowchart of an operation of an electronic device for controlling data buffers in a single manner in an uplink situation, according to an embodiment.

FIG. 10 is a flowchart for an operation of an electronic device for controlling data buffers in a single manner in an uplink situation, according to an embodiment. Operations described below may be executed by an electronic device or may be executed by a processor based on instructions included in a memory.

Referring to FIG. 10, at step 1005 of a method 1000, the processor may verify that the electronic device is connected to a first network. At step 1010, the processor may deliver a data packet for uplink transmission to a first modem. The processor may deliver a data packet to the first modem through a network device interface or a first data buffer.

At step 1015, the processor may verify that the electronic device switches from the first network to a second network. At step 1020, the processor may deliver a data packet to the second modem through the network device interface and the second data buffer. The electronic device may deliver a data packet to a modem corresponding to a network connected to the electronic device by verifying information about the network connected to the electronic device.

The processor may control an order where a data packet for uplink transmission is delivered. The processor may store a first address value at which data packets are stored in the first data buffer and a second address value at which data packets are stored in the second data buffer in a third data buffer. Since the processor delivers a data packet for uplink transmission to each modem in an order of address values stored in the third data buffer, although a network connected to the electronic device is switched, a data packet which previously remains in a data buffer may be transmitted to the modem without being missed.

According to an embodiment, an electronic device may include a first modem configured to support wireless communication for a first network, a second modem configured to support wireless communication for a second network, a processor configured to be electrically connected with the first modem and the second modem, a volatile memory configured to be electrically connected with the processor, and a nonvolatile memory configured to be electrically connected with the processor and include instructions. The instructions, when executed, may cause the processor to receive first data packets via the first modem, store the first data packets in a first data assigned to a first area of the volatile memory, receive second data packets via the second modem, store the second data packets in a second data buffer assigned to a second area of the volatile memory, and deliver the first data packets and the second data packets from the first data buffer and the second data buffer to an upper layer in an order where the first data packets and the second data packets are received. The second data packets may include the same IP destination address as the first data packets.

According to an embodiment, the instructions, when executed, may cause the processor to deliver the first data packets and the second data packets to the upper layer through a network device interface to which the IP destination address is assigned.

According to an embodiment, the instructions, when executed, may cause the processor to store first address values at which the first packets are stored in the first data buffer in a third data buffer assigned to a third area of the volatile memory, store second address values at which the second data packets are stored in the second data buffer in the third data buffer, and deliver the first data packets and the second data packets to the upper layer through the network device interface in an order in which the first address values and the second address values are stored in the third data buffer.

According to an embodiment, the instructions, when executed, may cause the processor to receive the second data packets via the second modem in response to detecting that a network connected to the electronic device through the upper layer is switched.

According to an embodiment, the instructions, when executed, may cause the processor to determine whether the storing of the first address values is completed and, when the storing of the first address values is completed, store the second address values in the third data buffer.

According to an embodiment, the instructions, when executed, may cause the processor to determine whether the storing of the first address values is completed, based on at least one of a size of the first area to which the first data buffer is assigned, the number of first data packets, a size of each of the first data packets, or a processing speed of the first data buffer.

According to an embodiment, the first modem may be configured to receive a signal of a lower frequency band than the second modem. Further, according to an embodiment, the first modem and the processor may be configured as one module.

According to an embodiment, an electronic device may include a first communication processor configured to provide first wireless communication based on a first protocol, a second communication processor configured to provide second wireless communication based on a second protocol, an application processor configured to be operatively connected with the first communication processor and the second communication processor, a volatile memory configured to be operatively connected with the application processor, and a nonvolatile memory configured to be operatively connected with the application processor. The nonvolatile memory may include instructions, when executed, cause the application processor to receive a first sequence of first data packets from a first network through the first communication processor, each of the first data packets including a first destination address, store the first data packets at first addresses on the volatile memory, receive a second sequence of second data packets from a second network through the second communication processor, each of the second data packets including the first destination address, store the second data packets at second addresses on the volatile memory, and store the first addresses and the second addresses at third addresses on the volatile memory.

According to an embodiment, the instructions, when executed, may cause the application processor to receive the first sequence while the application processor does not receive the second sequence and receive the second sequence while the application processor does not receive the first sequence.

According to an embodiment, the instructions, when executed, may cause the application processor to receive the second sequence after the application processor receives the first sequence and continue storing the second addresses subsequent to the first addresses at third addresses.

According to an embodiment, the first network may support an LTE protocol defined by 3GPP, and the second network may support a 5G communication protocol defined by the 3GPP.

According to an embodiment, the first communication processor may be integrally formed with the application processor. Further, according to an embodiment, the first data packets may differ in number from the second data packets.

According to an embodiment, the instructions, when executed, may cause the application processor to provide a network device interface which uses the first addresses and the second addresses stored at the third addresses.

According to an embodiment, an electronic device may include a first communication processor configured to provide first wireless communication based on a first protocol, a second communication processor configured to provide second wireless communication based on a second protocol, an application processor configured to be operatively connected with the first communication processor and the second communication processor, a volatile memory configured to be operatively connected with the application processor, and a nonvolatile memory configured to be operatively connected with the application processor. The nonvolatile memory may include instructions, when executed, cause the application processor to receive a first sequence of first data packets from a first network through the first communication processor, store the first data packets at first addresses on the volatile memory, receive a second sequence of second data packets from a second network through the second communication processor, store the second data packets at second addresses on the volatile memory, store the first addresses and the second addresses at third addresses on the volatile memory, and provide a network device interface which uses the first addresses and the second addresses stored at the third addresses. According to an embodiment, each of the first data packets may include the same destination address as a destination address included in each of the second data packets.

According to an embodiment, the instructions, when executed may cause the application processor to receive the first sequence while the application processor does not receive the second sequence and receive the second sequence while the application processor does not receive the first sequence.

According to an embodiment, the network device interface may be configured to deliver the first data packets and the second data packets to an upper layer. Further, according to an embodiment, the first communication processor may be integrally formed with the application processor.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
a first modem configured to support wireless communication for a first network;
a second modem configured to support wireless communication for a second network;
a processor configured to be electrically connected with the first modem and the second modem;
a volatile memory configured to be electrically connected with the processor; and
a nonvolatile memory configured to be electrically connected with the processor and include instructions,
wherein the instructions, when executed, cause the processor to:
receive first data packets via the first modem;
store the first data packets in a first data buffer assigned to a first area of the volatile memory;
receive second data packets via the second modem;
store the second data packets in a second data buffer assigned to a second area of the volatile memory; and
deliver the first data packets and the second data packets from the first data buffer and the second data buffer to an upper layer in an order in which the first data packets and the second data packets are received from a packet network, and
wherein the second data packets comprise the same internet protocol (IP) destination address as the first data packets, and
wherein the instructions, when executed, further cause the processor to:
receive the second data packets via the second modem in response to detecting that a network connected to the electronic device through the upper layer is switched.

2. The electronic device of claim 1, wherein the instructions, when executed, further cause the processor to:
deliver the first data packets and the second data packets to the upper layer through a network device interface to which the IP destination address is assigned.

3. The electronic device of claim 1, wherein the instructions, when executed, further cause the processor to:
store first address values at which the first packets are stored in the first data buffer in a third data buffer assigned to a third area of the volatile memory;
store second address values at which the second data packets are stored in the second data buffer in the third data buffer; and
deliver the first data packets and the second data packets to the upper layer through the network device interface in an order in which the first address values and the second address values are stored in the third data buffer.

4. The electronic device of claim 1, wherein the instructions, when executed, further cause the processor to:
determine whether the storing of the first address values is completed; and
when the storing of the first address values is completed, store the second address values in the third data buffer.

5. The electronic device of claim 4, wherein the instructions, when executed, further cause the processor to:
determine whether the storing of the first address values is completed, based on at least one of a size of the first area to which the first data buffer is assigned, the number of first data packets, a size of each of the first data packets, or a processing speed of the first data buffer.

6. The electronic device of claim 5, wherein the first modem is configured to receive a signal of a lower frequency band than the second modem.

7. The electronic device of claim 6, wherein the first modem and the processor are be configured as one module.

8. An electronic device, comprising:
a first communication processor configured to provide first wireless communication based on a first protocol;
a second communication processor configured to provide second wireless communication based on a second protocol;
an application processor configured to be operatively connected with the first communication processor and the second communication processor;
a volatile memory configured to be operatively connected with the application processor; and
a nonvolatile memory configured to be operatively connected with the application processor,
wherein the nonvolatile memory comprises instructions, when executed, cause the application processor to:
receive a first sequence of first data packets from a first network through the first communication processor, each of the first data packets including a first destination address;
store the first data packets at first addresses on the volatile memory;
receive a second sequence of second data packets from a second network through the second communication processor, each of the second data packets including the first destination address;
store the second data packets at second addresses on the volatile memory; and store the first addresses and the second addresses at third addresses on the volatile memory in an order in which the first sequence of first data packets and the second sequence of second data packets are received from a packet network, wherein the instructions, when executed, further cause the application processor to provide a network device interface which uses the first addresses and the second addresses stored at the third addresses, wherein the network device interface delivers the first data packets and the second data packets to an upper layer, and wherein the instructions, when executed, further cause the application processor to:

receive the second data packets via the second communication processor in response to detecting that a network connected to the electronic device through the upper layer is switched.

9. The electronic device of claim 8, wherein the instructions, when executed, further cause the application processor to:

receive the first sequence while the application processor does not receive the second sequence; and receive the second sequence while the application processor does not receive the first sequence.

10. The electronic device of claim 9, wherein the instructions, when executed, further cause the application processor to:

receive the second sequence after the application processor receives the first sequence; and continue storing the second addresses subsequent to the first addresses at third addresses.

11. The electronic device of claim 8, wherein the first network supports a long term evolution (LTE) protocol defined by 3rd generation partnership project (3GPP), and wherein the second network supports a 5th generation (5G) communication protocol defined by the 3GPP.

12. The electronic device of claim 11, wherein the first communication processor is integrally formed with the application processor.

13. The electronic device of claim 8, wherein the first data packets differ in number from the second data packets.

14. An electronic device, comprising:

a first communication processor configured to provide first wireless communication based on a first protocol;

a second communication processor configured to provide second wireless communication based on a second protocol;

an application processor configured to be operatively connected with the first communication processor and the second communication processor;

a volatile memory configured to be operatively connected with the application processor; and a nonvolatile memory configured to be operatively connected with the application processor, wherein the nonvolatile memory comprises instructions, when executed, cause the application processor to:

receive a first sequence of first data packets from a first network through the first communication processor;

store the first data packets at first addresses on the volatile memory;

receive a second sequence of second data packets from a second network through the second communication processor;

store the second data packets at second addresses on the volatile memory;

store the first addresses and the second addresses at third addresses on the volatile memory in an order in which the first data packets and the second data packets are received from a packet network; and provide a network device interface which uses the first addresses and the second addresses stored at the third addresses, wherein the network device interface delivers the first data packets and the second data packets to an upper layer, and wherein the instructions, when executed, further cause the application processor to:

receive the second data packets via the second communication processor in response to detecting that a network connected to the electronic device through the upper layer is switched.

15. The electronic device of claim 14, wherein each of the first data packets comprises the same destination address as a destination address included in each of the second data packets.

16. The electronic device of claim 14, wherein the instructions, when executed, further cause the application processor to:

receive the first sequence while the application processor does not receive the second sequence; and receive the second sequence while the application processor does not receive the first sequence.

17. The electronic device of claim 16, wherein the first communication processor is integrally formed with the application processor.

* * * * *